United States Patent [19]

Cole

[11] Patent Number: 5,319,188
[45] Date of Patent: Jun. 7, 1994

[54] COLLINATED LIGHT DIRECTION SENSOR SYSTEM

[75] Inventor: Eugene O. Cole, Albuquerque, N. Mex.

[73] Assignee: The United States of America as represented by the Secretary of the Air Force, Washington, D.C.

[21] Appl. No.: 19,958

[22] Filed: Feb. 19, 1993

[51] Int. Cl.$^5$ .............................................. H01J 40/14
[52] U.S. Cl. .................................. 250/206.2; 356/152; 250/203.4
[58] Field of Search ............. 250/208.6, 206.2, 206.1, 250/203.4, 203.6, 216, 237 R; 356/152, 141

[56] References Cited

U.S. PATENT DOCUMENTS

| Re. 33,228 | 6/1990 | Buchtel et al. | 250/203.6 |
|---|---|---|---|
| 3,406,287 | 10/1968 | Zito et al. | 250/206.2 |
| 3,423,593 | 1/1969 | Chinnock | 250/206.2 |
| 3,987,297 | 10/1976 | Brienza et al. | 250/206.2 |
| 4,424,801 | 1/1984 | Mori | 250/203.4 |
| 4,624,563 | 11/1986 | Johnson | 356/152 |
| 4,625,108 | 11/1986 | Nestel et al. | 250/227 |
| 4,626,100 | 12/1986 | Johnson | 356/152 |
| 4,639,589 | 1/1987 | Weber et al. | 250/203 R |
| 4,674,874 | 6/1987 | Halldorsson et al. | 356/152 |
| 4,710,618 | 12/1987 | Matsumoto et al. | 250/206.2 |
| 4,874,937 | 10/1989 | Okamoto | 250/206.2 |
| 4,962,311 | 10/1990 | Poisel et al. | 250/216 |
| 4,967,065 | 10/1990 | Edwards | 250/203.6 |
| 5,023,440 | 6/1991 | Kuppenheimer, Jr. | 250/203.6 |
| 5,113,065 | 5/1992 | Heynau | 250/208.6 |

OTHER PUBLICATIONS

EG-G Reticon, Self-Scanned Circular Photodiode Array RO0064N, 1986, 4-3-4-6.

Primary Examiner—David C. Nelms
Attorney, Agent, or Firm—Donald J. Singer; Irwin P. Garfinkle

[57] ABSTRACT

A system for determining the angles of elevation and azimuth of a source of collimated energy comprises a detector consisting of an annular entrance opening in an opaque structure, and an annular segmented optical detector spaced from and axisymmetric with the opening. Laser, or other collimated light energy passing through the opening illuminates all, or particular portions of the segmented detector depending on the direction and angle of incidence of the energy, thereby providing all of the information necessary to determine the elevation and azimuth of the source of the energy.

6 Claims, 3 Drawing Sheets

COLLINATED LIGHT DIRECTION SENSOR SYSTEM

STATEMENT OF GOVERNMENT INTEREST

The invention described herein may be manufactured and used by or for the Government for governmental purposes without the payment of any royalty thereon.

This invention is for an optical detection system which is primarily useful in detecting incident laser illumination, permitting simple signal processing to determine the direction of the illumination.

The detection system in accordance with this invention uses a detector comprising, in its simplest terms, an annular or circular entrance opening in an opaque plate, and a circular optical detector spaced from and axisymmetric with the opening. Laser, or other collimated light energy passing through the opening illuminates all, or particular portions of the detector depending on the direction and angle of incidence of the energy, thereby providing all of the information necessary to determine the elevation and azimuth of the source of the energy.

Although a single detector provides all the required data to determine the elevation and azimuth of a source of collimated light energy, a plurality of such detectors can be installed in an array to provide overlapping fields of view. The detectors may be mounted adjacent one another on a planar surface, or the detectors may be mounted adjacent one another on a spherical surface to provide a "bug eye" field of view.

The system is non-imaging, that is, it requires no lenses for focussing energy which passes through the circular opening. For the purpose of providing selectively to certain wavelengths, the invention contemplates the use of filters.

BACKGROUND OF THE INVENTION

There is a need for an angle of arrival laser detection system that provides a wide field of view and that can resolve the direction of incident laser illumination to less than a degree in both elevation and azimuth. Currently, there are non-coherent laser detectors that have a large field of view (2 Pi Steradians). These systems use both imaging and non-imaging optics. In systems using imaging optics, use is made of multiple apertures with lenses to focus the incoming laser light and display the image (a spot) on a focal plane to determine the X, Y and Z coordinates. These focused systems provide good resolution, but require lenses and sufficient signal processing to convert a focused spot into X, Y, and Z components, and then into polar coordinates. The primary disadvantage of these systems is their cost and complexity.

In the systems which are non-imaging, a single detector element is placed in each aperture to detect incident radiation. Comparison between the received energy from adjacent apertures is then converted into a digital count that represents the energy at each aperture and an algorithm similar to that used in mono-pulse radar is used to define the direction of the source of maximum energy intensity. While the non-imaging systems are simpler than imaging systems, the resolution is not as good as the focussed system, and signal processing requires analogue to digital conversion, and then a comparison with the received signal power from adjacent apertures to compute the direction of maximum received power. Current systems which use this technique can resolve the direction of an incident laser source to some degree, but the signal processing technique is a multi-step process in that the incident energy through each of a plurality of adjacent apertures is first detected in an analog detector; then each analog signal is digitalized; all of the digital outputs from the adjacent apertures are then compared to determine the "best fit" resultant, which is then used to determine the direction vector of the source of maximum intensity. There are several disadvantages to this approach. First improved resolution requires multiple overlapping apertures, and in addition, the signal processing techniques that are required are susceptible to intensity modulations that could cause false results. As a result of using amplitude comparison techniques, these variations will then result in increased error in determining the correct direction vector.

PATENTED PRIOR ART

A search of the prior art revealed the following United States patents, none of which is believed to anticipate the invention disclosed and claimed herein:

U.S. Pat. No. 4,962,311 discloses a detector device for the directionalized detection of laser radiation. The device has a plurality of individual optics, which together can measure radiation throughout a defined total angle of detection. Each individual optical system comprises a fiber optic guide with a corresponding light concentrator, which has a generally funnel-shaped, dynamically balanced design, tapered towards the end of the fiber optic guide.

U.S. Pat. No. 4,639,589 discloses an optical scanning device which has rotatable elements and lenses.

U.S. Pat. No. 4,626,100 discloses a remote laser locator system for viewing a wide field of view and detecting the angular position of a remote laser. A laser beam directed toward the sensor from any position within a 90 degree circular field-of-view can be detected to a positional accuracy of less than 0.1 degree in a two-axis coordinate system. The system utilizes an in line or coaxial optical sensor having field-of-view (FOV) optics that compress the field-of-view. The compressed output from the FOV optics is directed through a polarizer and filter to a phase shifter. The phase shifter encodes the angle of incidence of the laser beam as a phase shift between the two components of the polarized input beam. Then an analyzer decomposes the beam into two linear component beams which are processed through a second phase shifter and analyzer pair which are rotated axially with respect to the first pair to provide four distinct component beams. These components are condensed through a re-imager lens and coupled to an array of intensity detectors. The array detector outputs are then combined to provide two normalized signal proportional to a trigonometric function of the two components of the angle of incidence of the laser beam, indicative of its position in space.

U.S. Pat. No. 4,625,108 discloses a sensor head, hemispherical in form, in which a plurality of optical fibers is uniformly distributed mounted. The other ends of the optical fibers are gathered into a bundle whose end face opposes a detector matrix comprising a plurality of detectors. By a subsequently arranged evaluating circuit, and by assigning the detectors to the individual optical fibers there is determined the direction and, by summing up the individual charges of the detectors, there is also recognized the intensity of the incident radiation.

U.S. Pat. No. 4,674,874 discloses a device for detecting the presence and direction of a pulsating or intensity-modulated laser radiation, in which the direction of radiation is exactly determined measured time intervals. A system with two detector elements is provided, with the first element producing a starting signal immediately when the laser radiation is incident, and the second element producing a stop signal which is delayed in time relative thereto.

U.S. Pat. No. Re. 33,228 discloses an optical scanning apparatus embodied in a gyroscopic missile seeker to provide a rosette scan pattern of the field of view. A single driving motor is employed with a traction drive assembly to produce the necessary counter-rotation of scanned elements and thereby effect the rosette scan pattern.

OBJECTS OF THE INVENTION

It is a primary object of this invention to provide an Angle of Arrival laser detector and system which is simple, and which is capable of high resolution.

Another object of this invention is to provide an Angle of Arrival light energy detector which comprises a circular opening in an opaque plate and an axisymmetric detector spaced therefrom, the area and location of the energy on the detector being the determinant of the location of the source of energy.

Still another object of this invention is to provide an Angle of Arrival light energy detector which comprises a circular opening in an opaque plate and an annular, axisymmetric detector spaced therefrom, the detector being circumferentially segmented, the particular segments of the detector on which the light energy is distributed being the determinant of the location of the source of energy.

Yet another object of this invention is to provide an Angle of Arrival light energy detector which comprises a circular opening in an opaque plate and an axisymmetric detector spaced therefrom, the area and location of the energy on the detector being the determinant of the location of the source of energy, the detector comprising an annular ring of individual detector segments, each illuminated segment providing a digital output.

Still another object of this invention is to provide a plurality of such detectors, adjacent detectors having an overlapping field of view.

Another object of this invention is to provide a plurality of such detectors, adjacent detectors having an overlapping field of view, said detectors being mounted on the surface of a sphere, whereby the detector system may have a very wide field of view.

BRIEF DESCRIPTION OF THE DRAWINGS

For further objects and advantages of this invention, reference should now be made to the following specification and to the accompanying drawings in which:

FIGS. 6a, 6b and 6c are response curves for detectors having different fields of view.

DESCRIPTION OF THE PREFERRED EMBODIMENTS

Figure 1:
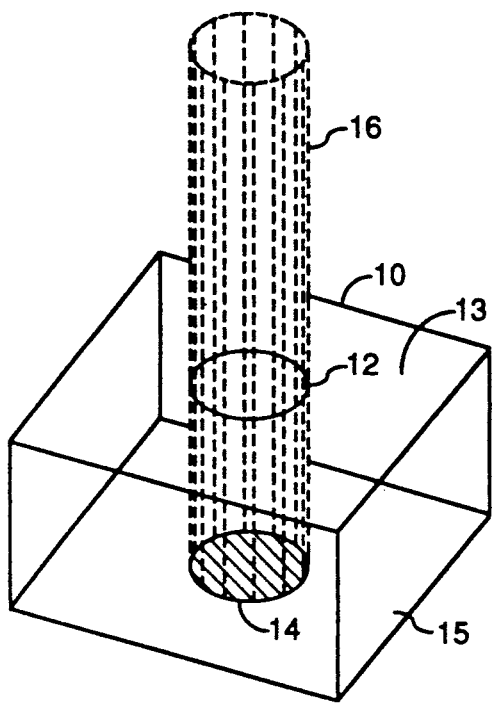
FIGS. 1 and 2 are sketches showing certain of the basic concepts involved in this invention.
Figure 2:
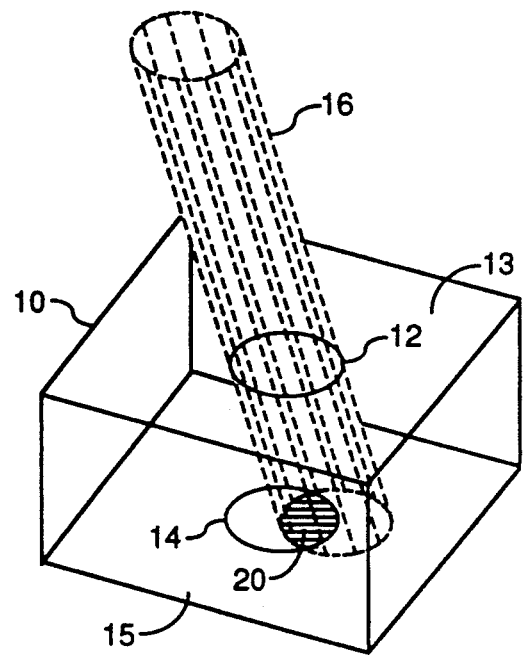

The sketches in FIGS. 1 and 2 illustrate the broadest concept of the invention. As seen in FIGS. 1 and 2, the basic detector system comprises a housing structure 10, having a circular entrance aperture 12, and a circular detector 14 spaced from the aperture 12, and axisymmetric therewith; that is, the plane 13 of the aperture 12 is parallel to the plane 15 of the detector 14, and both have the same axis. In actual practice the housing 10 may comprise a solid slab or cylinder in which there is the circular entrance aperture, and the detector 14 is positioned at the opposite or exit end. It is important that the detector 14 be surrounded by non-reflecting, or minimum reflecting walls, or as in FIG. 1, by airspace.

As seen in FIG. 1, collimated light energy, depicted by the dotted lines 16, passes through the aperture 12 and illuminates the entire surface 18 of the detector 14 when the source of the energy is normal to the plane 13 of the detector, that is when the light energy source is "boresighted", as shown. As seen in FIG. 2, when the collimated light energy 16 passes through the aperture 12 at an angle with respect to the plane of the detector, only a portion 20 of the detector 14 is illuminated. The size and location of the particular portion 20 is the determinant of the angles of elevation and azimuth of the light energy 16.

Collimated light passing through a circular aperture produces a circular intensity pattern that is independent of angle of incidence. The circular entrance aperture is much larger than the wavelength of the light, and therefore, the ray tracing parameters necessary for this application are defined by geometric optics. While the invention requires collimated light, and is therefore useful in determining the angle of arrival of laser energy, the coherent characteristic of laser energy is not germane. The spot size of the collimated light is equal to or larger than the size of each detector segment.

The field of view of the detector is a cone having an angle which is determined by the ratio of the entrance aperture 12 and the axial distance between the aperture 12 and the detector 14.

Figure 3:
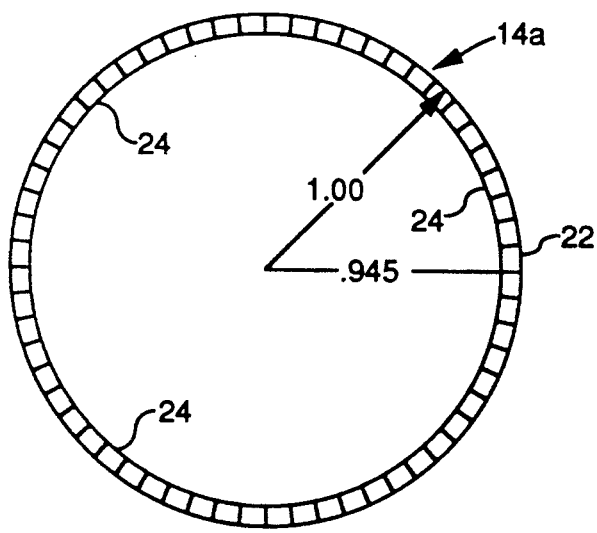
FIGS. 3 and 4 are sketches of annular detectors.
Figure 4:
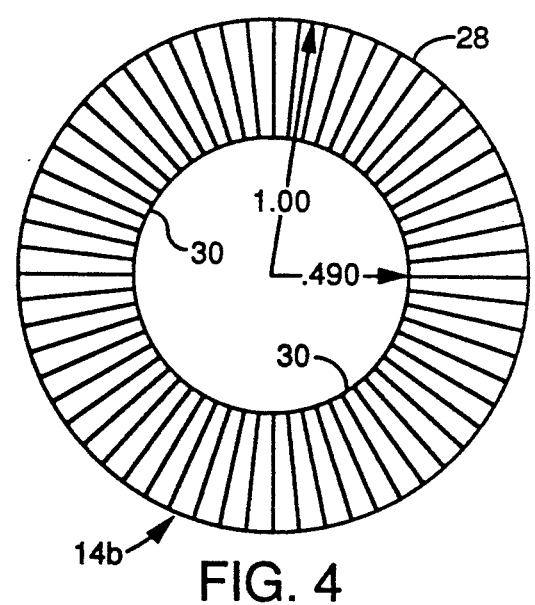

The detector 14 may be made in several forms. Two preferred constructions are illustrated in FIGS. 3 and 4. The detector 14a shown in FIG. 3 comprises an annular ring 22, having the same outer diameter as the aperture 12, and an inner diameter which is slightly less. In a practical case the inner diameter was 94.5% of the outer diameter. The ring 22 comprised a plurality of individual pixels 24, each of which develops an electrical output when illuminated with light energy.

The detector 14b illustrated in FIG. 4 is similar to that of FIG. 3, except that it is comprised of a ring 28 having an inner diameter which was 49% of its outer diameter. The individual pixels 30, are much larger than those shown in FIG. 3, and may develop a larger output for a given signal strength.

Although not shown, the pixels may cover the entire surface of the detector 14, but this may have an adverse affect on resolution, so that there is a trade-off between sensitivity and resolution in choosing the inner diameter of the detector. It is also apparent that the number of pixels in the rings 24 and 28 is also an important resolution factor, that is, the more pixels, the higher the resolution.

Commercially available detectors sold off the shelf under the Reticon trademark by E.G. & G Corporation, come in several configurations. It is noted that annular ring detectors of FIGS. 3 and 4 are available in detector rings having 64 pixel elements and 720 pixel elements.

To calculate the angle of elevation, it is merely necessary to count the number of pixels which are illuminated and then compare that count with a lookup table. To determine azimuth, it is merely necessary to determine which of the pixels is at the center of the array of the illuminated pixels.

Figure 5A:
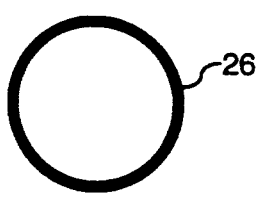
FIGS. 5a, 6b and 6c illustrate the effect of laser direction on detector response.
Figure 5B:
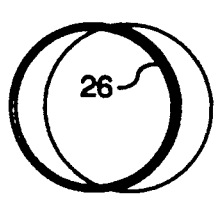
Figure 5C:
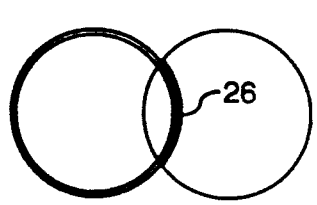

FIGS. 5a-c, depict the detector response versus the direction of the laser. In FIG. 5a, the entire ring of pixels 26 is illuminated, as indicated by the dark circle, when the light energy is normal to the detector, that is, in alignment with the boresight. FIG. 5b shows the light off boresight at about mid range, while FIG. 5c shows the light on the pixels near the end of the range.

Figure 6A:
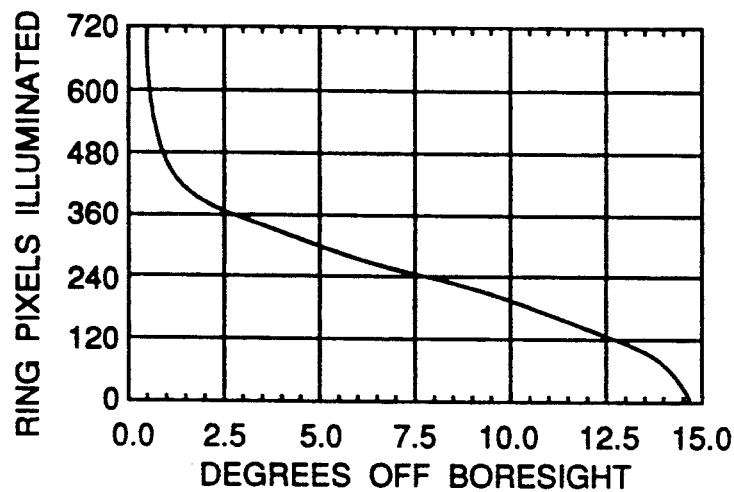
Figure 6B:
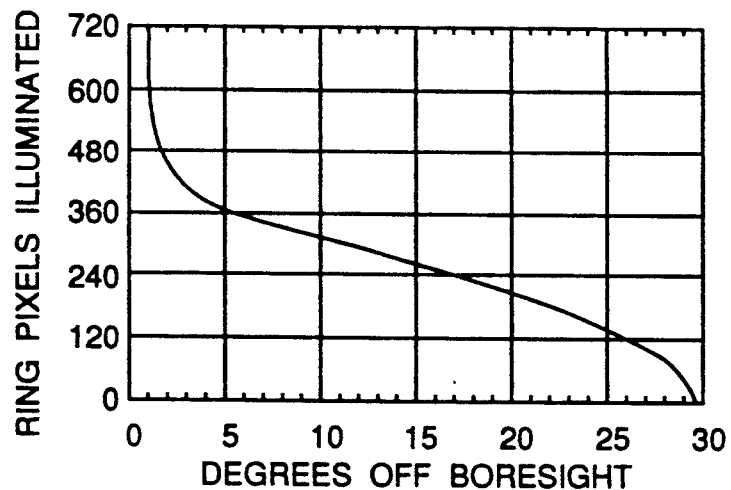
Figure 6C:
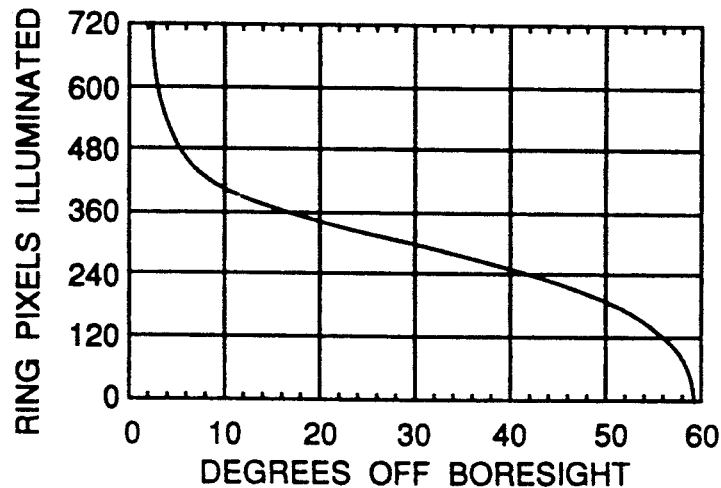

FIGS. 6a-c are curves which plot the area of the illuminated pixel elements as a function of degrees off boresight. FIG. 6a is a plot for a detector having a field of view of 15 degrees; FIG. 6b is a plot for a detector having a field of view of 30 degrees, and FIG. 6c is a plot for a detector having a field of view of 60 degrees. In each case, the ratio of the inner detector diameter to the outer detector ring diameter is 0.945.

Figure 7:
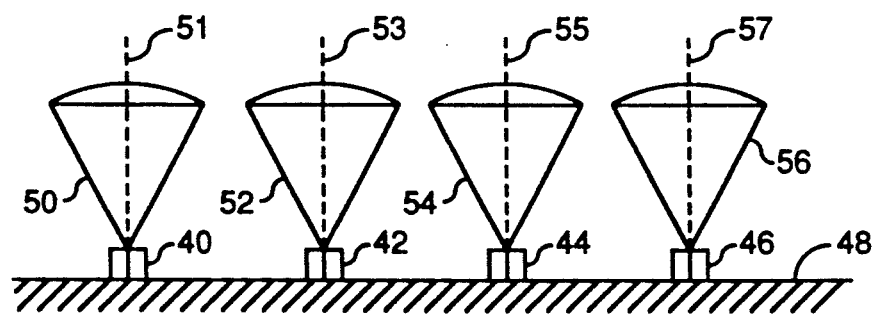
FIG. 7 is a sketch of a detector system using a plurality of detectors mounted on a plane surface.

FIG. 7, shows a plurality of detectors 40, 42, 44, and 46 mounted side by side on a plane surface 48. The axes 51, 53, 55 and 57 of the detectors are parallel, but respective fields of view, as represented by the conical line 50, 52, 54 and 56 are overlapping. Each of the detectors will therefore be a different angle to the collimated light source. The pixels which are illuminated by the side by side detectors are compared, and using simple algorithms, or look-up tables precise angles of elevation and azimuth can be determined.

Figure 8:
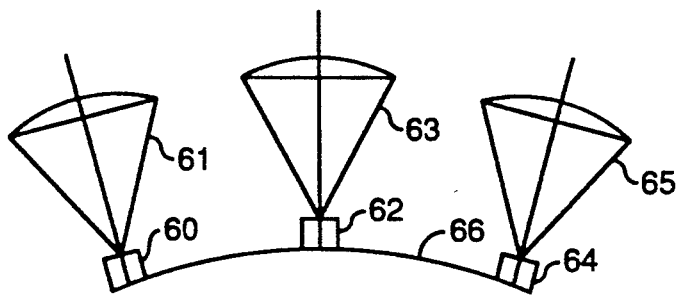
FIG. 8 shows three detectors mounted on an arc.

In FIG. 8 three detectors 60, 62 and 64 are shown mounted on an arc 6. The arc 56 may be on a circumference of a cylinder. The fields of view 61, 63 and 65 of the respective detectors are overlapping, but their "boresight" axes are on diverging axes. By using a large number of these detectors on a major portion of a circumference, an overall detector system is provided with a very wide angle field of view, possibly more than 180 degrees.

Figure 9:
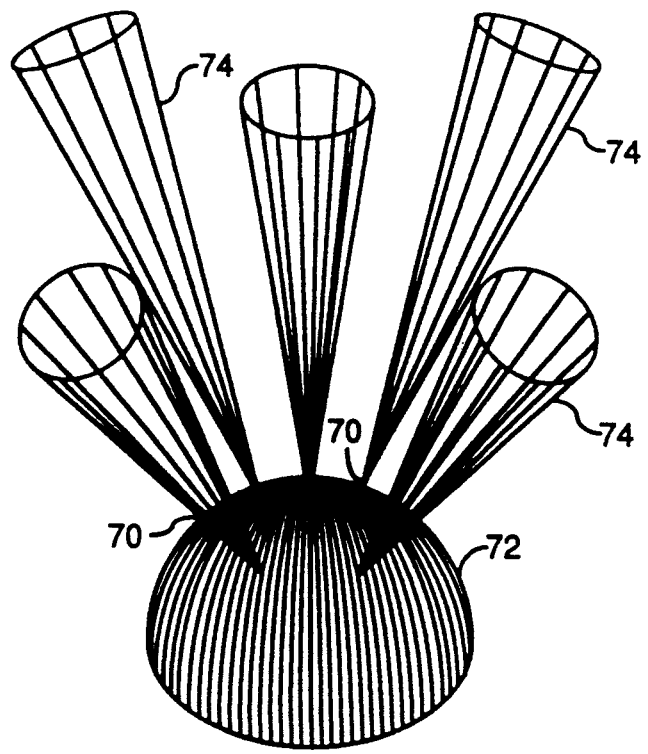
FIG. 9 shows the concept of multiple detectors mounted on the surface of a sphere.

FIG. 9 shows the "bug eye" concept where a plurality of detectors 70 are distributed on the surface of a sphere 72. The overlapping fields of view 74 provide a very wide angle system capable of detecting energy source emanating in space.

The advantages of the basic unit are many. First, the system uses non-imaging optics. This means that no focusing lenses are used in the primary optical system. Specifically, the incident laser illuminated is never collected or focused to present an image of point spot on a focal plane detector array.

Another advantage of the system is the use of a circular aperture as the entrance aperture to the system. The entrance aperture. While the system requires no imaging, optical filters may be mounted in the entrance aperture to make the system selective to certain frequencies.

A most important advantage of the circular detector array is the ease of digitalization. In its simplest form, the system can be used by noting which pixels are illuminated, and then determining the angle of arrival of light energy by means of a look up table. Similar results can be obtained with a circular detector, by calculating the illuminated area.

While the housing for the detector is shown in FIGS. 1 and 2 as rectangular, as a practical matter, a detector which was reduced to practice for laboratory testing was made by drilling a hole through a nylon cylinder, and mounting the annular detector ring at the exit of the hole. It is important that walls surrounding the detector be essentially non-reflective.

It will be apparent to persons skilled in the art that this invention is capable of many variations and adaptations. It is intended therefore, that the scope of the invention be limited only by the following claims as interpreted in the light of the prior art.

What is claimed is:

1. An angle of arrival detection system for determining the angles of elevation and azimuth of a source of collimated light energy, said system including at least one detector comprising:
   a non-reflective stationary structure;
   a circular opening in said structure;
   an annular ring comprised of a plurality of separate radial light sensing pixel segments, spaced from and axisymmetric with said opening, the outer diameter of said annular ring of radial light sensing pixel segments being equal to the diameter of the circular opening of said structure, and the inner diameter of said ring of light sensing segments being equal to from approximately 50% to 95% of the outer diameter, said annular ring being comprised of from 64 to 720 segments, collimated light energy from said source passing through said opening and illuminating a plurality of said light sensing pixel segments the particular plurality of said light sensing pixel segments which are illuminated being dependent on the angle of incidence of said energy, thereby providing digital information necessary to determine the angles of elevation and azimuth of the source of said energy; and
   wherein said structure is a cylinder, and said circular opening is at one end of said cylinder, and said annular ring of pixel segments is at the other end, said opening and said ring being coaxial with said cylinder.

2. The detection system as defined in claim 1 wherein a plurality of said light detectors are mounted in adjacent relationship on a planar surface.

3. The detection system as defined in claim 2 wherein said plurality of detectors have an overlapping field of view.

4. The detection system as defined in claim 1 wherein a plurality of said light detectors are mounted in adjacent relationship on a spherical surface.

5. The detection system as defined in claim 4 wherein said plurality of detectors have an overlapping field of view.

6. The detection system as defined in claim 1 wherein said system includes a plurality of adjacent detectors having overlapping fields of view and mounted on the surface of a sphere.

* * * * *

UNITED STATES PATENT AND TRADEMARK OFFICE
CERTIFICATE OF CORRECTION

PATENT NO. : 5,319,188
DATED : 7 JUNE 1994
INVENTOR(S) : EUGENE O. COLE

It is certified that error appears in the above-identified patent and that said Letters Patent is hereby corrected as shown below:

On the title page, Item [54] and Column 1, line 2:

IN THE TITLE

Change the word "COLLINATED" to —COLLIMATED—.

Signed and Sealed this

Sixth Day of September, 1994

Attest:

BRUCE LEHMAN

Attesting Officer     Commissioner of Patents and Trademarks